(12) United States Patent
DePaula et al.

(10) Patent No.: US 8,469,280 B2
(45) Date of Patent: Jun. 25, 2013

(54) PROGRAMMING DEVICES AND PROGRAMMING METHODS

(75) Inventors: Andrew DePaula, Spokane, WA (US); Larry Aamodt, College Place, WA (US); Ronald Vyhmeister, Yucaipa, CA (US)

(73) Assignee: intelliPaper, LLC, Spokane, WA (US)

( * ) Notice: Subject to any disclaimer, the term of this patent is extended or adjusted under 35 U.S.C. 154(b) by 0 days.

(21) Appl. No.: 13/081,434

(22) Filed: Apr. 6, 2011

(65) Prior Publication Data

US 2012/0131250 A1 May 24, 2012

Related U.S. Application Data

(63) Continuation-in-part of application No. 12/604,300, filed on Oct. 22, 2009, now Pat. No. 8,047,443.

(60) Provisional application No. 61/321,238, filed on Apr. 6, 2010.

(51) Int. Cl.
*G06K 19/06* (2006.01)

(52) U.S. Cl.
USPC ............................................................ 235/492

(58) Field of Classification Search
USPC ............................................................ 235/492
See application file for complete search history.

(56) References Cited

U.S. PATENT DOCUMENTS

| | | | |
|---|---|---|---|
| D267,009 S | 11/1982 | Doi | |
| 4,780,603 A | 10/1988 | Hamada | |
| 4,849,617 A | 7/1989 | Ueda | |
| 4,850,105 A | 7/1989 | Nakajima et al. | |
| 5,004,899 A | 4/1991 | Ueda | |
| D320,225 S | 9/1991 | Ido et al. | |
| 5,710,421 A | 1/1998 | Kokubu | |
| 5,818,030 A | 10/1998 | Reyes | |
| 5,888,624 A | 3/1999 | Haghiri et al. | |
| 6,097,605 A | 8/2000 | Klatt et al. | |
| 6,109,939 A | 8/2000 | Kondo et al. | |
| 6,333,854 B1 | 12/2001 | Sasaoka et al. | |
| D452,865 S | 1/2002 | Wallace et al. | |
| 6,341,728 B1 | 1/2002 | Kondo et al. | |
| D458,935 S | 6/2002 | Hiroki | |
| 6,480,390 B2 | 11/2002 | Matsumiya et al. | |
| 6,531,775 B1 | 3/2003 | Kobayashi et al. | |

(Continued)

FOREIGN PATENT DOCUMENTS

| DE | 19601358 | 7/1996 |
|---|---|---|
| EP | 1798732 A1 | 6/2007 |

(Continued)

OTHER PUBLICATIONS

PCT/US2009/061725, filed Jun. 7, 2010, Search Report.

(Continued)

*Primary Examiner* — Kristy A Haupt
(74) *Attorney, Agent, or Firm* — Wells St. John P.S.

(57) ABSTRACT

A programming device includes communication circuitry for communicating with an electronic device. A first set of one or more electrical contacts connected to the communication circuitry and configured to physically contact a corresponding second set of one or more electrical contacts located on a substrate. One or more guides configured to align the first and second sets of electrical contacts when the substrate physically contacts the one or more guides.

17 Claims, 4 Drawing Sheets

U.S. PATENT DOCUMENTS

| | | |
|---|---|---|
| 6,547,151 B1 | 4/2003 | Baldi |
| 6,567,273 B1 | 5/2003 | Liu et al. |
| 6,580,615 B1 | 6/2003 | Nakanishi et al. |
| 6,665,201 B1 | 12/2003 | Spencer et al. |
| D487,458 S | 3/2004 | Gentil et al. |
| 6,699,053 B2 | 3/2004 | Kuroda |
| 6,700,788 B2 | 3/2004 | Matsushita et al. |
| 6,735,656 B2 | 5/2004 | Hanke et al. |
| D490,814 S | 6/2004 | Kim |
| 6,744,634 B2 | 6/2004 | Yen |
| 6,773,280 B2 | 8/2004 | Sasaki et al. |
| 6,783,060 B2 | 8/2004 | Marappan |
| 6,808,424 B2 | 10/2004 | Kaneshiro et al. |
| 6,824,066 B2 | 11/2004 | Weyant |
| 6,858,925 B2 | 2/2005 | Wada et al. |
| 6,865,086 B2 | 3/2005 | Gochnour et al. |
| 6,900,988 B2 | 5/2005 | Yen |
| 6,908,038 B1 | 6/2005 | Le |
| 6,970,359 B2 | 11/2005 | Gochnour et al. |
| 6,994,263 B2 | 2/2006 | Ueda et al. |
| 7,004,794 B2 | 2/2006 | Wang et al. |
| D518,483 S | 4/2006 | Yu et al. |
| 7,025,623 B2 | 4/2006 | Katsumata et al. |
| 7,040,919 B2 | 5/2006 | Yao |
| 7,083,107 B2 | 8/2006 | Sakamoto et al. |
| 7,102,891 B2 | 9/2006 | Miks et al. |
| 7,104,809 B1 | 9/2006 | Huang |
| D532,788 S | 11/2006 | Cuellar et al. |
| D542,797 S | 5/2007 | Cuellar et al. |
| 7,218,528 B2 | 5/2007 | Chen |
| D545,311 S | 6/2007 | Wai |
| 7,233,499 B2 | 6/2007 | Yu et al. |
| 7,269,004 B1 | 9/2007 | Ni et al. |
| D553,130 S | 10/2007 | Fiorentino et al. |
| 7,334,725 B2 | 2/2008 | Dan |
| 7,340,540 B2 | 3/2008 | Miller et al. |
| 7,344,072 B2 | 3/2008 | Gonzalez et al. |
| D565,572 S | 4/2008 | Yang |
| 7,355,860 B2 | 4/2008 | Miller et al. |
| 7,357,655 B1 | 4/2008 | Van der Steen |
| 7,364,090 B2 | 4/2008 | Cuellar et al. |
| 7,377,448 B2 | 5/2008 | Dan et al. |
| 7,392,358 B2 | 6/2008 | Chen et al. |
| 7,434,739 B2 | 10/2008 | Matsuura et al. |
| D591,753 S | 5/2009 | Nakano et al. |
| 7,537,169 B2 | 5/2009 | Gonzalez et al. |
| D612,385 S | 3/2010 | Aoki |
| 7,721,956 B2 | 5/2010 | Williams et al. |
| 2002/0036236 A1 | 3/2002 | Kondo et al. |
| 2002/0074415 A1 | 6/2002 | Kondo et al. |
| 2002/0084332 A1 | 7/2002 | Kondo et al. |
| 2002/0116668 A1 | 8/2002 | Chhor et al. |
| 2003/0081388 A1 | 5/2003 | Yang |
| 2003/0109179 A1 | 6/2003 | Kaneshiro et al. |
| 2004/0070952 A1 | 4/2004 | Higuchi et al. |
| 2004/0087213 A1 | 5/2004 | Kao |
| 2004/0089717 A1 | 5/2004 | Harari et al. |
| 2004/0089724 A1 | 5/2004 | Lasch et al. |
| 2004/0188531 A1 | 9/2004 | Gengel et al. |
| 2005/0077164 A1 | 4/2005 | Dhers |
| 2006/0098485 A1 | 5/2006 | Leenders et al. |
| 2006/0118639 A1 | 6/2006 | Kean et al. |
| 2006/0154525 A1 | 7/2006 | Bychov et al. |
| 2006/0180674 A1 | 8/2006 | Margalit et al. |
| 2006/0181716 A1 | 8/2006 | Hoshina |
| 2006/0255158 A1 | 11/2006 | Margalit et al. |
| 2006/0273154 A1 | 12/2006 | Dan |
| 2006/0278723 A1* | 12/2006 | Dan et al. ................. 235/492 |
| 2006/0288169 A1 | 12/2006 | Steiner |
| 2007/0028046 A1 | 2/2007 | Pham |
| 2007/0099511 A1 | 5/2007 | Miller et al. |
| 2007/0153565 A1 | 7/2007 | Nomura et al. |
| 2007/0243769 A1 | 10/2007 | Atsmon et al. |
| 2007/0252010 A1 | 11/2007 | Gonzalez et al. |
| 2008/0087731 A1 | 4/2008 | Gonzalez et al. |
| 2008/0109309 A1 | 5/2008 | Landau et al. |
| 2008/0224320 A1 | 9/2008 | Palmade et al. |
| 2008/0239406 A1 | 10/2008 | Nakano |
| 2008/0294991 A1 | 11/2008 | Wong et al. |
| 2008/0299788 A1 | 12/2008 | Balchaytis |
| 2009/0009829 A1 | 1/2009 | Katsuyama |
| 2009/0014522 A1 | 1/2009 | Harris et al. |
| 2009/0063755 A1 | 3/2009 | Perng et al. |
| 2010/0218021 A1* | 8/2010 | Ma et al. ................. 713/323 |
| 2010/0289844 A1 | 11/2010 | Seibt |

FOREIGN PATENT DOCUMENTS

| | | |
|---|---|---|
| EP | 098227309 | 5/2012 |
| WO | WO 2005/124932 A2 | 12/2005 |
| WO | WO 2008/020442 | 2/2008 |
| WO | WO 2008/036537 | 3/2008 |
| WO | PCT/US2009/061725 | 4/2011 |
| WO | PCT/US2011/031432 SR | 12/2011 |
| WO | PCT/US2011/031432 WO | 12/2011 |
| WO | PCT/US2011/031473 SR | 12/2011 |
| WO | PCT/US2011/031473 WO | 12/2011 |
| WO | PCT/US2011/031645 SR | 12/2011 |
| WO | PCT/US2011/031645 WO | 12/2011 |
| WO | PCT/US2011/031646 SR | 12/2011 |
| WO | PCT/US2011/031646 WO | 12/2011 |
| WO | PCT/US2011/031432 | 10/2012 |
| WO | PCT/US2011/031473 | 10/2012 |
| WO | PCT/US2011/031645 | 10/2012 |
| WO | PCT/US2011/031646 | 10/2012 |

OTHER PUBLICATIONS

PCT/US2009/061725, filed Jun. 7, 2010, Written Opinion.

Sony Press Release; "TOPPAN and Sony Successfully Develop 25GB Paper Disc"; Apr. 15, 2004; www.sony.net/SonyInfo/News/Press_Archive/2004/04-15E/; 2pp.

Website—www.minicdwizard; 2000; 1 p.

"Unversal Serial Bus Specification Revision 2.0"; Figure 6.9; pp. 99; Feb. 1998.

* cited by examiner

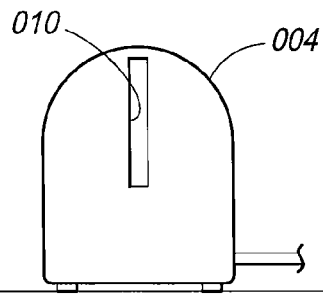 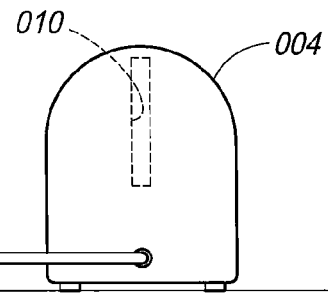
FIG. 3A  FIG. 3B
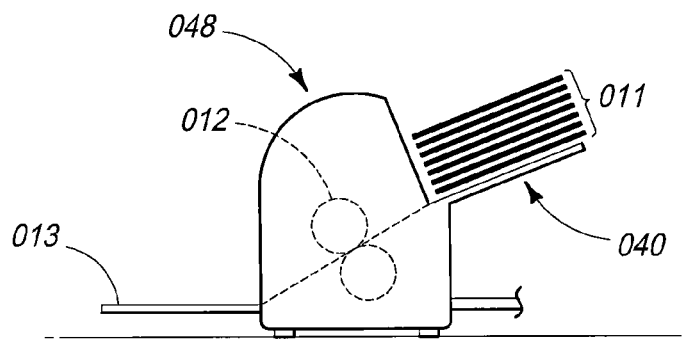
FIG. 4
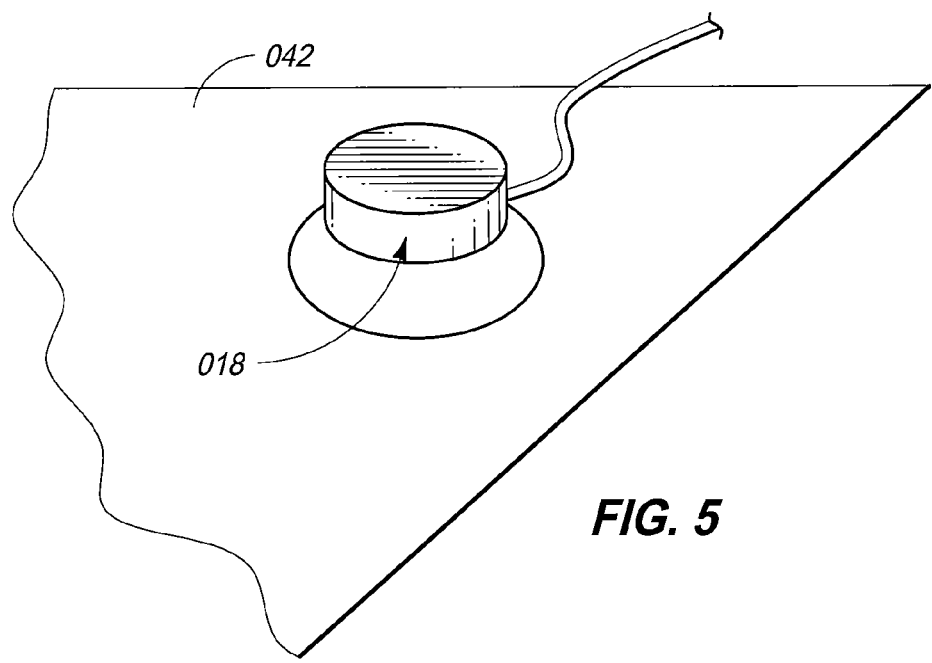
FIG. 5

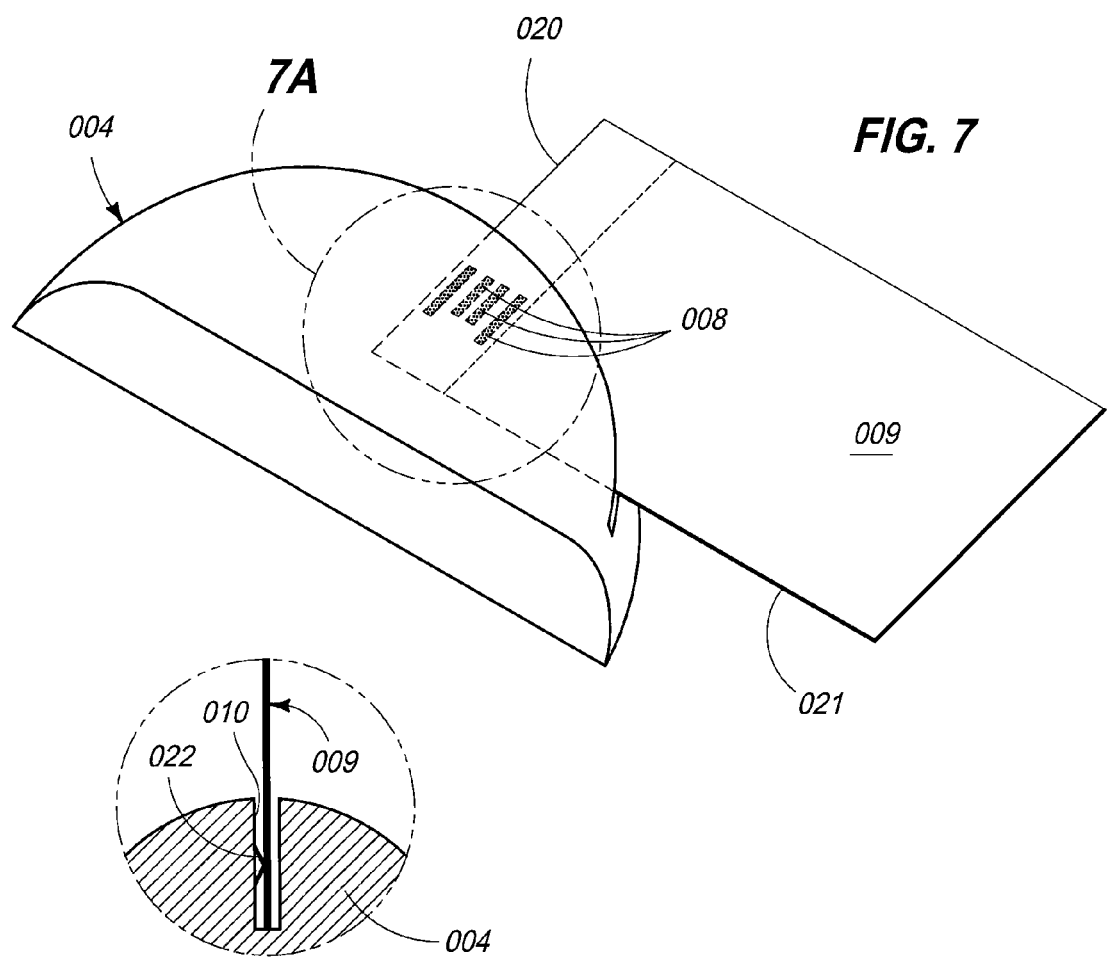
FIG. 7
FIG. 7A
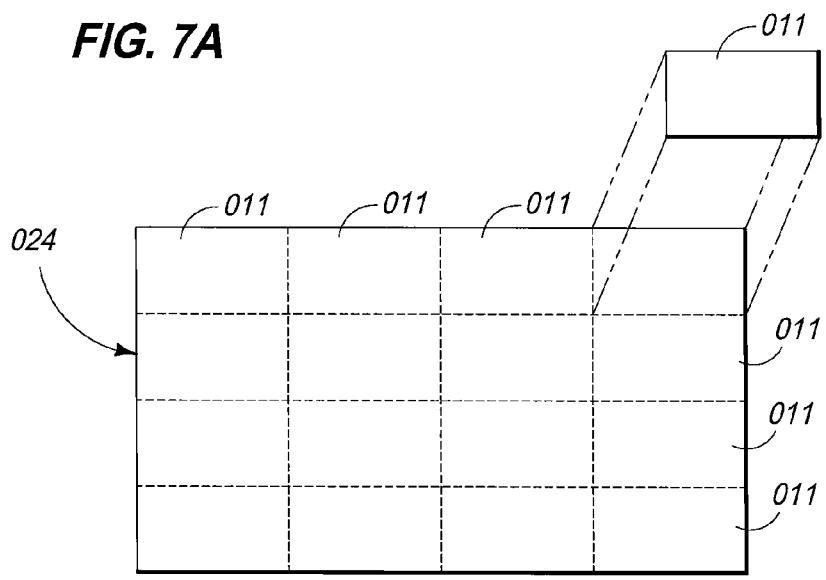
FIG. 8

PROGRAMMING DEVICES AND PROGRAMMING METHODS

RELATED PATENT DATA

This application claims the benefit of, and priority to, U.S. Provisional Patent Application Ser. No. 61/321,238, filed Apr. 6, 2010, the entire disclosure of which is incorporated herein by reference. This application is a continuation in part of U.S. patent application Ser. No. 12/604,300 filed Oct. 22, 2009 now U.S. Pat. No. 8,047,443, which is incorporated herein by reference.

TECHNICAL FIELD

The present disclosure, in various embodiments, relates to programming devices and programming methods.

BACKGROUND OF THE INVENTION

Portable data storage devices, such as USB thumb drives are widely used due to their ease of use and small size. Although prices of such drives have fallen dramatically, and capacities have increased significantly, such drives do not satisfy all portable data needs.

BRIEF DESCRIPTION OF THE DRAWINGS

Preferred embodiments of the disclosure are described below with reference to the following accompanying drawings.

FIG. 3A illustrates a front view of a programming device in accordance with an embodiment.

FIG. 3B illustrates a rear view of the programming device shown in FIG. 3A in accordance with an embodiment.

FIG. 4 illustrates a side view of a programming device in accordance an embodiment.

FIG. 5 illustrates a perspective view of a programming device in accordance an embodiment.

FIG. 7 illustrates a method of using a programming device in accordance with an embodiment.

FIG. 7A illustrates a breakaway view of the method-of-use view shown in FIG. 7.

FIG. 8 illustrates a partial exploded view of a data storage device in accordance with an embodiment.

DETAILED DESCRIPTION OF THE PREFERRED EMBODIMENTS

Figure 1:
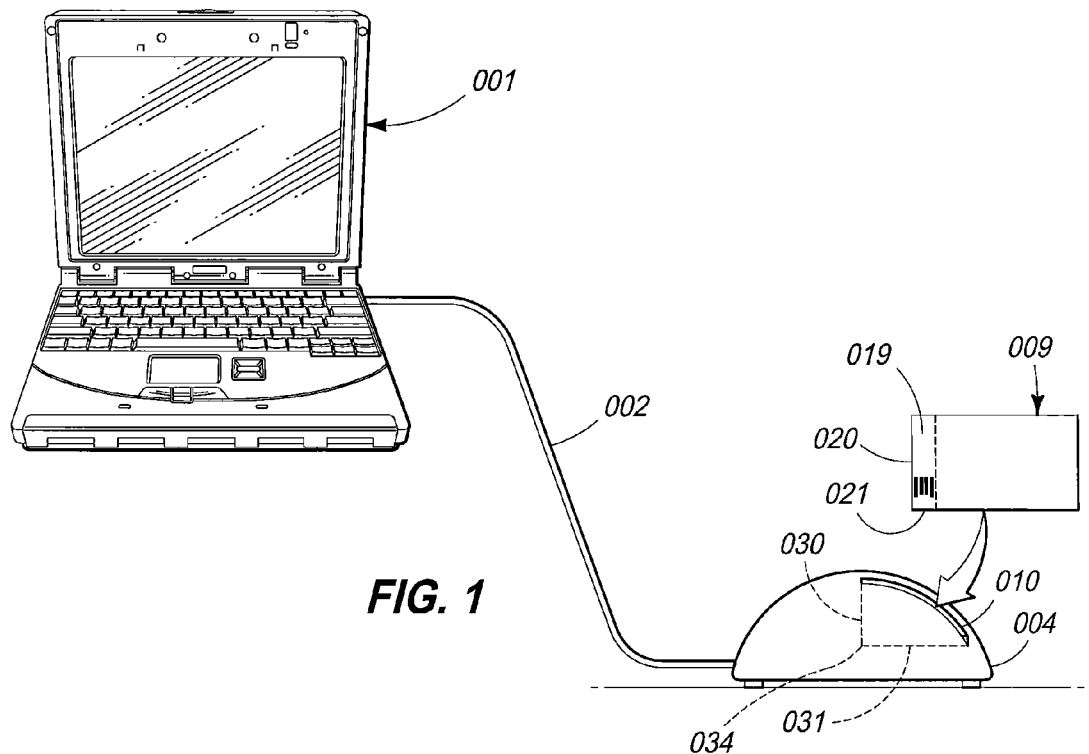
FIG. 1 illustrates a method of using a programming device in accordance with an embodiment.

INTELLIPAPER is defined as the patent pending technology allowing the creation of products containing electronic marketing materials (e.g., pdf files, photograph files, video files, etc.) and other electronic data where the digital bits and a substrate (e.g., paper) are fused into a cohesive whole that is virtually indistinguishable from its common paper counterpart. In one embodiment, a region of a substrate includes electronic circuitry configured to store the marketing materials and/or other electronic data. The substrate may comprise pulp products such as paper and cardboard, synthetic paper, coated paper, laminated paper, plastic films, polymers, and/or other suitable materials. In one embodiment, the substrate may be a piece of paper or card stock.

The region may be delimited from the rest of the substrate by perforations. The region may be detached and folded so that the region is sized for insertion into a USB connector (e.g., USB socket) of a computer (e.g., a desktop computer, laptop computer, smart phone, tablet computer, or other computing device). Once inserted into the USB connector, the marketing materials and/or other electronic data stored by the electronic circuitry can be read from the electronic circuitry by the computer.

In other embodiments, the region of the substrate comprising the electronic circuitry need not be detached from the rest of the substrate because the electronic circuitry may be configured to wirelessly communicate with the computer using a wireless communications protocol (e.g., Bluetooth, wireless USB, or other wireless communications protocol). In these embodiments, the electronic circuitry may include an antenna. In some embodiments, power for the electronic circuitry may be wirelessly transferred to the electronic circuitry.

DEVICE, as used herein, refers to a unique product made out of INTELLIPAPER such as a business card, or greeting card.

Example embodiments of DEVICES and INTELLIPAPER are described more fully in U.S. patent application Ser. No. 12/604,300, which is incorporated herein by reference.

Embodiments of the present invention are directed to programming devices and methods for programming data into the electronic circuitry of INTELLIPAPER without removing the detachable perforated region 019 (illustrated in FIG. 2), which would destroy the integrity of the DEVICE which forms a part of INTELLIPAPER. The current invention also includes methods of wirelessly programming DEVICES that do not incorporate a detachable region. One purpose of the invention is to establish an electrical connection between a programming device and INTELLIPAPER, and to transfer data to and/or from the INTELLIPAPER via the programming device. The data transfer may be done via physical electrical contact or wireless connection, both of which are described herein. The current invention may be advantageous because some embodiments of INTELLIPAPER in their default state are not suitable for direct connection with standard USB connectors due to their dimensions. For example, such embodiments may be planar instead of folded, and therefore might not fit into a Standard USB connector. Furthermore, the invention may be advantageous since a computer might not include hardware for establishing direct, wireless communication INTELLIPAPER.

Programming a DEVICE, may happen in many different situations. For example, end users may program DEVICES at home a few at a time. In contrast, resellers of INTELLIPAPER business cards may rapidly program large quantities of DEVICES prior to sale.

Referring to FIG. 1, a programming device 004 for programming DEVICES 009 one at a time using a computing device 001 is illustrated. Examples of computing devices 001 include a desktop computer, personal computer (PC), laptop computer, smart phone, tablet computer, or other computing device. Programming device 004 is connected to computing device 001 via a USB cable 002. In one embodiment, programming device 004 maps the USB contacts of the USB cable internally to make electrical surface contact with mating USB contacts 008 on DEVICE 009 via simple friction once DEVICE 009 is inserted into programming device 004.

Still referring to FIG. 1, and referring to FIGS. 3A and 3B, programming device 004 includes a structure or housing having an opening 010 to receive DEVICE 009. The opening may be a slot 010 that readily receives the thin configuration of DEVICE 009, which, as was discussed previously, may be a product made from INTELLIPAPER. Slot 010 extends from an outermost periphery of the programming device 004 into programming device 004. In one embodiment, slot 010 includes a substantially straight side 030 intersecting a substantially straight bottom 031 to form a corner 034. Corner 034 may be a right angle corner 034 in one embodiment. Other angles are also possible. For example, the intersection between side 030 and bottom 031 may form a corner 034 having an angle between about 10 degrees and about 175 degrees, based on the configuration of DEVICE 009.

Figure 2:
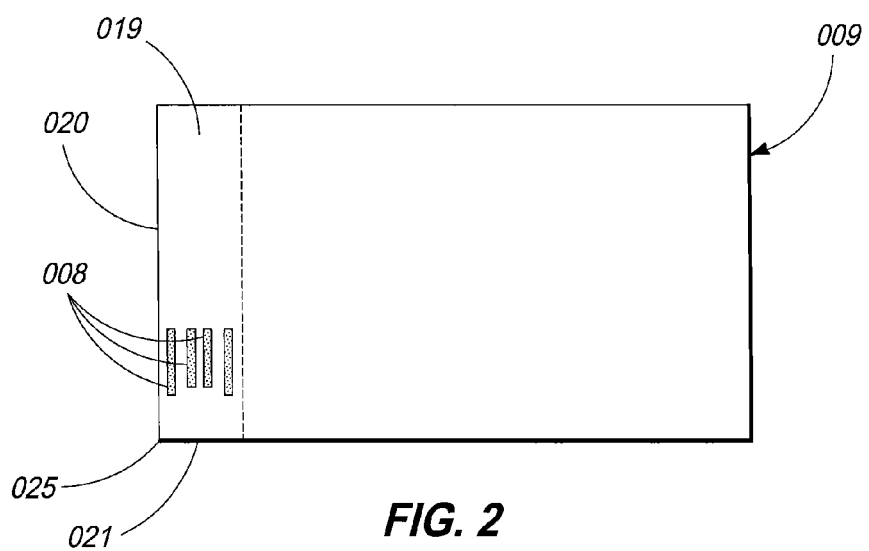
FIG. 2 illustrates a face view of a data storage device in accordance with an embodiment.

Still referring to FIG. 1 and referring to FIG. 2, DEVICE 009 is configured substantially as a rectangle wherein the DEVICE 009 includes a first edge 020 intersecting a second edge 021 at a corner 025 having an angle of substantially 90 degrees. DEVICE 009 is provided or slid (or slipped) into slot 010 of programming device 004. First and second edges 020, 021 of DEVICE 009 make contact and slide along side 030 and bottom 031 of slot 010 until corner 025 of DEVICE 009 rests in corner 034 of programming device 004. With this cooperation, DEVICE 009 is correctly positioned in slot 010 of programming device 004 wherein slot 010 can be considered to function as one or more guides configured to align USB contacts 008 of DEVICE 009 to physically contact electrical contacts 022 of programming device 004 via friction. With this electrical connection, DEVICE 009 is electrically coupled with the attached computer 001 which allows computer 001 to program DEVICE 009 without destroying the integrity of DEVICE 009 (e.g., without having to fold DEVICE 009).

Programming device 004 may include communication circuitry (not illustrated) that provides electrical connectivity between electrical contacts 022 and cable 002 to allow communication between DEVICE 009 and computer 001. In one embodiment of the invention, the communication circuitry is configured for passive communication between the computer 001 and DEVICE 009. Furthermore, in another embodiment, communication circuitry is configured to implement USB protocols. Alternatively, programming device 004 may include communication circuitry that implements wireless communication between electrical contacts 022 and computer 001 without the use of cable 002 to allow communication between DEVICE 009 and computer 001.

Referring to FIGS. 7 and 7A, programming device 004 may include a biasing structure (e.g., a moveable member, not illustrated) that forces (e.g., biases, pushes) DEVICE 009, that has been inserted into slot 010, towards contacts 022 (for example in a direction perpendicular to slot 010) to ensure a reliable electrical connection between contacts 022 and USB contacts 008 of DEVICE 009. Alternatively, contacts 022 of programming device 004 may be biased to force or push DEVICE 009 that has been inserted into slot 010 against a fixed surface of the programming device 004 to ensure a reliable electrical connection between contacts 022 and USB contacts 008 of DEVICE 009. In this embodiment, slot 010 is configured to receive only a portion of DEVICE 009. Alternatively, a programming device may include a slot 010 configured to receive all or a portion of DEVICE 009.

Contacts 002 may be a first set of one or more electrical contacts for programming device 004. Alternatively, in another embodiment of the invention, programming device 004 may include two or more sets of electrical contacts 022. In yet another embodiment of the invention, programming device 004 may include two or more electrical contacts 022. Both alternative embodiments may facilitate electric connectivity with DEVICE 009 when DEVICE 009 is positioned in slot 010.

Some versions of programming device 004 may connect directly to computer 001 without requiring an additional cable 002, and be smaller than others and designed for travel. Other versions may be larger and more suitable for desktop use. Some versions of programming device 004 may be passive and simply provide USB connectivity from computer 001 to DEVICE 009 by electrically connecting each contact point 008 on DEVICE 009 to a contact point in a USB receptacle of computer 001. Other versions may include electronics to perform various advanced functions such as programming multiple DEVICES 009 with the same content without further involving computer 001. Wireless connectivity between programming device 004 and computer 001 is also possible using one or more of the wireless technologies described herein.

Note that DEVICE 009 may be substantially planar when inserted into slot 010 and is not folded and DEVICE 009 may have a thickness that is substantially thinner than a standard USB plug and is thinner than slot 010. USB contact 008 may be located substantially anywhere on DEVICE 009. The size of slot 010 and positions of edges 020 and 021 relative to contacts 022 may be selected to match a particular DEVICE 009 so that when DEVICE 009 is inserted into slot 010 and is in contact with edges 020 and 021, contacts 022 line up and are in physical and electrical contact with USB contacts 008.

It should be understood that dimensions for DEVICE 009, which may be a very thin paper product, result in DEVICE 009 being incompatible for establishing electrical communication with conventional communication ports (e.g., USB sockets) of electronic devices such as computers. That is, DEVICE 009 has dimensions incompatible for establishing electrical communication in a conventional USB receptacle. Stated another way, DEVICE 009 may have a thickness dimension that is substantially thinner than a opening of a conventional USB plug.

Although DEVICES having USB contacts are described herein, DEVICES may have substantially any electrical contacts that facilitate communication with the invention. The electrical contacts may vary in number and size and may comply with one or more standards other than USB standards.

In one embodiment, the invention may include a visual indicator that indicates to a user that the invention has made electrical contact with a DEVICE. The invention may alternatively or additionally include a visual indicator that indicates to a user that programming of a DEVICE has been successfully completed that that the user may safely remove the DEVICE from the invention.

Referring to FIG. 4, another embodiment of the invention is disclosed for a programming device 048 capable of serially feeding itself a stack of DEVICES 011 for programming. For example, programming device 048 includes a feeder (or feed mechanism) 040 that supports and positions a plurality of DEVICES 011 for serially feeding therein. Upon being serially feed into programming device 048, DEVICES 011 are then programmed automatically and quickly, one after the other, without further operator intervention. That is, individual DEVICES 011 are mechanically fed into programming device 048 by being drawn through conductor rollers 012, DEVICES 011 are then programmed (e.g., via the conductor rollers 012), and then DEVICES 011 are driven to exit programming device 048 and rest in receipt tray 013 with each DEVICE 011 containing the programming data.

Still referring to FIG. 4 and referring to FIG. 8, another embodiment for utilizing the programming device 048 of FIG. 4 includes serially feeding respective substrate sheets (e.g., paper sheets) wherein each sheet contains a plurality of DEVICES 024 (see. FIG. 8) to be programmed (as in the case of multiple business cards on a single sheet before they are cut apart). In this embodiment, programming device 048 may include multiple contact heads (not shown) to correspond to multiple DEVICES 024 on a single sheet and be configured to program each DEVICE 024 on the sheet as the sheet passes through the programming device. A feed mechanism 040 of programming device 048 correctly positions the electrical contacts of DEVICES 024 relative to the electrical contacts of programming device 048 to make electrical contact with each DEVICE 024 for programming. For example, the invention may detect the current position of the edge of DEVICE 024 and adjust itself or DEVICE 024, or both, so that the edge is in a desired position.

Exact dimensions for the locations of a DEVICE's contacts, or the programming device's contacts, and the relationship between the dimensions of the programming device and the dimensions of the DEVICE may vary, because each DEVICE could have contacts positioned differently depending on the end application of the DEVICE. Generally, a set of DEVICE contacts may be on an outer edge near a corner, to facilitate the detachment of a region as previously described in currently pending U.S. patent application Ser. No. 12/604,300.

Figure 6A:
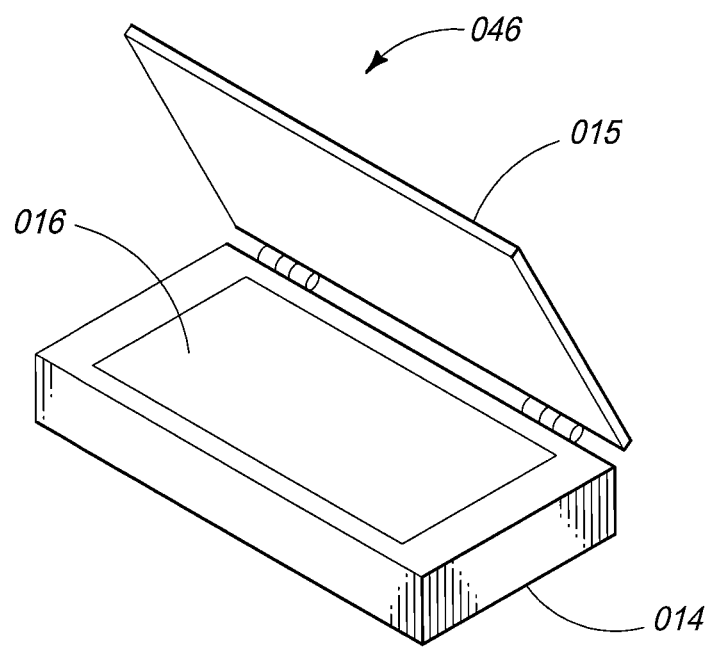
FIG. 6A illustrates a perspective view of a programming device in accordance with an embodiment.
Figure 6B:
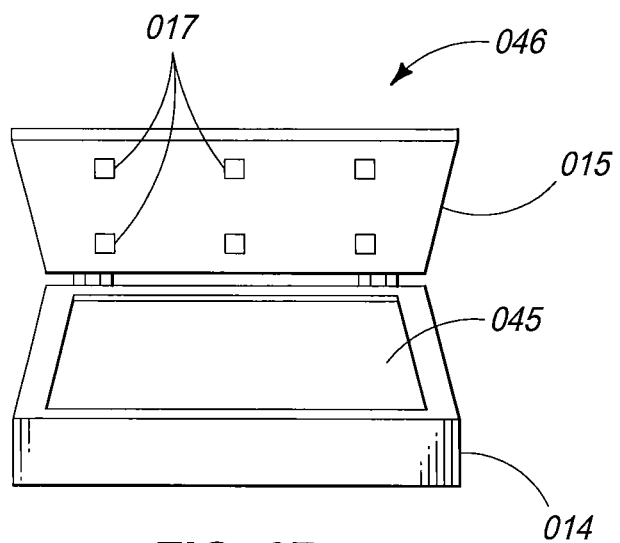
FIG. 6B illustrates a front view of the programming device shown in FIG. 6A in accordance with an embodiment.

Referring to FIGS. 6A and 6B, another embodiment of the invention is disclosed for a programming device 046 capable simultaneously programming an entire sheet of INTELLIPAPER 016 comprising a plurality of DEVICES. Programming device 046 has a body 014 supporting a surface 045, which receives sheet 016. Programming device 046 further includes a programming head 015 having one or more individual contact heads 017, depending on the number of DEVICES comprised by sheet 016. Programming device 046 functions similar to a photocopier wherein sheet 016 is moved onto the surface. Programming head 015 may be brought down over sheet 016 and each DEVICE may programmed simultaneously. The individual contact heads 017 may be fixed, or alternatively, may be movable and repositionable relative programming head 015 (either manually or automatically). An automatic feed mechanism (not shown) may be provided as in earlier embodiments so that many sheets 016 of DEVICES can be automatically programmed in sequence. In this embodiment, each contact head makes electrical contact with the contacts on the surface of an individual DEVICE via downward pressure, thereby allowing the programming (alone, or in conjunction with an attached computer).

Referring to FIG. 5, another programming device 018 configured as a weighted puck is illustrated. Programming device 018 has spring loaded electrical contact points (not shown) on its underside. This programming device 018 can be positioned over a DEVICE or sheet of DEVICES 042 and set down so that the contacts of the programming device 018 make connection with the contacts of sheet 042 with the weight assisting in making a good electrical connection. A mechanism (not shown) may be provided to visually align said contacts properly. Furthermore, an indicator (e.g., visual or audible indicatory) may indicate to a user that electrical connection has been established between the contacts of sheet 042 and programming device 018.

In another embodiment, a programming device includes an enclosure containing electronic circuitry for communicating wirelessly with INTELLIPAPER devices. Such circuitry may provide power to electronic circuitry of the INTELLIPAPER via electromagnetic radiation, and establish data communication with the electronic circuitry of the INTELLIPAPER. In this embodiment, the invention might not include a slot in which the DEVICE is inserted. Instead, physical proximity of the INTELLIPAPER and the invention would allow for programming. A number of indicators and/or buttons may be provided to give feedback to the user as to the status of programming and the connectivity of the INTELLIPAPER DEVICE to the invention. In this embodiment, the invention may comprise batteries thereby eliminating the need for it to be physically connected to the computer via USB. In this case, communication between the invention and the computer may also be done wirelessly. In some embodiments, the enclosure may include shielding configured to prevent DEVICES other than the DEVICE within the enclosure from being programmed.

In one embodiment, a programming device may further include electronic circuitry that may execute software and/or firmware to perform a variety of advanced functions including but not limited to: compression and decompression of data, serialization of the data programmed (so the data on each DEVICE is unique relative to other DEVICEs and can be distinguished from other DEVICEs by a unique identifier such as a serial number, name, address, or other unique identifier), encryption and cryptographic signatures for data integrity and other uses including virus scanning. Additional software may also be provided to run on the attached PC in the form of drivers or other software to enhance and/or augment any of these advanced functions.

In one embodiment, a programming method includes connecting a programming device to a computer (via cable, or wirelessly), placing a DEVICE (or a sheet of DEVICES) into the exemplary programming device (or placing the DEVICE on or below or near the exemplary programming device) to accomplish electrical connectivity between the DEVICE and the exemplary programming device. The method further includes transferring data from the computer to the DEVICE (or DEVICEs) via the programming device.

The method may also include verifying that the data stored by the DEVICE matches the data provided by the computer (e.g., by reading the data from the DEVICE and comparing the read data with an original version of the data). In one embodiment, the computer may perform the verification. In another embodiment, the exemplary programming device may perform the verification.

In compliance with the statute, the invention has been described in language more or less specific as to structural and methodical features. It is to be understood, however, that the invention is not limited to the specific features shown and described, since the means herein disclosed comprise various forms of putting the invention into effect. The invention is, therefore, claimed in any of its forms or modifications within the proper scope of the appended claims appropriately interpreted in accordance with the doctrine of equivalents.

The invention claimed is:

1. A programming device comprising:
   communication circuitry for communicating with an electronic device;
   a first set of one or more electrical contacts connected to the communication circuitry and configured to physically contact a corresponding second set of one or more electrical contacts located on a substrate; and
   one or more guides configured to align the first and second sets of electrical contacts when the substrate physically contacts the one or more guides, further comprising a feed mechanism to serially feed a plurality of the substrates to the first set of the one or more electrical contacts.

2. The device of claim 1 wherein the electronic device comprises a port configured for establishing electrical communication, and wherein the substrate comprises dimensions incompatible for establishing electrical communication in the port.

3. The device of claim 1 wherein the electronic device comprises a USB receptacle for establishing electrical communication and wherein the substrate comprises dimensions incompatible for establishing electrical communication in the USB receptacle.

4. The device of claim 1 wherein the electronic device comprises a USB receptacle configured to receive a USB plug for establishing electrical communication, and wherein the substrate comprises a thickness dimension that is substantially thinner than a USB plug.

5. The device of claim 1 wherein the electronic device comprises a computer.

6. The device of claim 1 wherein the communication circuitry comprises circuitry implementing wireless communication.

7. The device of claim 1 wherein the communication circuitry comprises circuitry implementing USB protocols.

8. A programming device comprising:
   a structure comprising a receiving area configured to receive at least a portion of a substrate in a preset position;
   communication circuitry in the structure and configured to receive and transmit data;
   a first set of one or more electrical contacts connected to the communication circuitry and configured to physically contact a corresponding second set of one or more electrical contacts located on the portion of the substrate when the substrate is in the preset position;
   a detection device configured for detecting a current position of the substrate relative the preset position; and
   an adjustment device configured to reposition the substrate from the current position to the preset position.

9. The device of claim 8 further comprising an indicator configured to indicate that the first and second sets of the one or more electrical contacts are in physical contact.

10. The device of claim 8 further comprising a biasing structure secured in the structure and configured to force the substrate toward the first set of the one or more electrical contacts.

11. The device of claim 8 wherein the first set of the one or more electrical contacts are movably biased to contact the substrate.

12. The device of claim 8 wherein the communication circuitry comprises circuitry implementing wireless communication.

13. The device of claim 8 wherein the communication circuitry comprises circuitry implementing USB protocols.

14. A programming method comprising:
   providing at least one substrate to be programmed, the substrate comprising communication circuitry;
   interfacing the communication circuitry with a data storage device comprising program data; and
   transmitting the program data via the communication circuitry to the at least substrate wherein:
   the at least one substrate comprises a plurality of substrates; and
   the transmitting comprises transmitting the program data simultaneously to the plurality of substrates.

15. The method of claim 14 wherein:
   the data storage device comprises a computer; and
   the interfacing comprises providing a structure comprising a set of one or more electrical contacts electrically coupled to the communication circuitry of the substrate.

16. The method of claim 14 further comprising verifying the program data transmitted matches the program data stored on the data storage device.

17. A programming method comprising:
   providing at least one substrate to be programmed, the substrate comprising communication circuitry;
   interfacing the communication circuitry with a data storage device comprising program data; and
   transmitting the program data via the communication circuitry to the at least substrate wherein:
   the at least one substrate comprises a plurality of substrates; and
   the transmitting comprises transmitting the program data serially to the plurality of substrates.

* * * * *

UNITED STATES PATENT AND TRADEMARK OFFICE
CERTIFICATE OF CORRECTION

PATENT NO. : 8,469,280 B2  Page 1 of 1
APPLICATION NO. : 13/081434
DATED : June 25, 2013
INVENTOR(S) : Andrew DePaula, Larry Aamodt and Ronald Vyhmeister It is certified that error appears in the above-identified patent and that said Letters Patent is hereby corrected as shown below:

On Title Page 2, Column 2, line 6, under item (56) References Cited, Other Publications – Replace "Unversal" with --Universal--

In the Specification

Column 2, line 51 – Replace "communication INTELLIPAPER" with --communication with INTELLIPAPER--

Column 4, line 39 – Replace "a opening" with --an opening--

Column 4, line 59 – Replace "feed into" with --fed into--

Column 5, lines 30-31 – Replace "capable simultaneously" with --capable of simultaneously--

Column 5, line 40 – Replace "may programmed" with --may be programmed--

Signed and Sealed this
Nineteenth Day of November, 2013

Teresa Stanek Rea
*Deputy Director of the United States Patent and Trademark Office*